Dec. 7, 1926.

S. T. CAMPBELL 1,610,200

STORAGE BATTERY CONTAINER

Filed Nov. 13, 1924

Inventor
Stanley T. Campbell
By Thurston Kwis & Hudson
Attorneys

Patented Dec. 7, 1926.

1,610,200

UNITED STATES PATENT OFFICE.

STANLEY T. CAMPBELL, OF CLEVELAND, OHIO, ASSIGNOR TO THE AETNA RUBBER COMPANY, OF CLEVELAND, OHIO, A CORPORATION OF OHIO.

STORAGE-BATTERY CONTAINER.

Application filed November 13, 1924. Serial No. 749,617.

This invention relates to storage battery containers and has particular reference to containers of the multi-compartment type, such as are generally formed of hard rubber by a molding process.

One of the objects of the present invention is to provide an improved handle of the bail type, the invention in this aspect residing particularly in the anchorage or manner of attaching the bail proper, whereby the screws or equivalent fastening devices for the anchorage plates are wholly relieved of the load or pull when the weight of the battery is supported by the bail.

A further object is to provide a container having two types of handles and consisting of a bail adapted to extend across the top of the container, and the other of fixed handles secured to the ends of the container whereby the battery of which the container forms a part, may be used effectively for a plurality of different uses. such for example, as radio use and for starting, lighting and ignition use on motor vehicles.

The invention may be briefly summarized as consisting in certain novel details of construction, and combinations and arrangements of parts which will be described in the specification and set forth in the appended claims.

Figure 1:
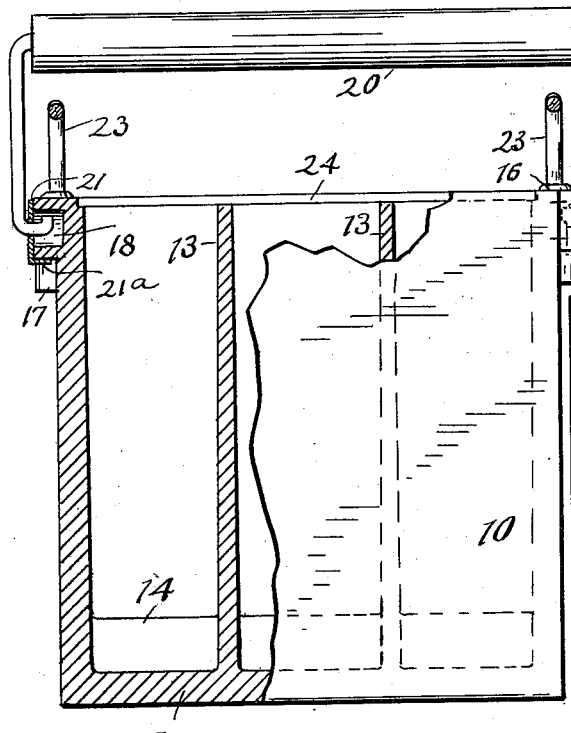
Figure 2:
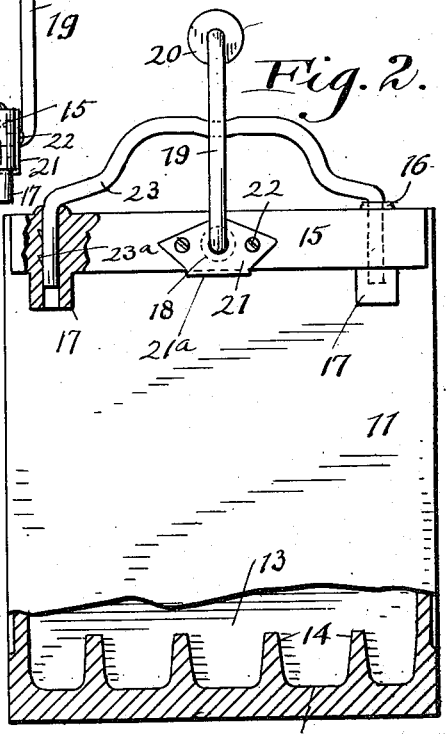
Figure 3:
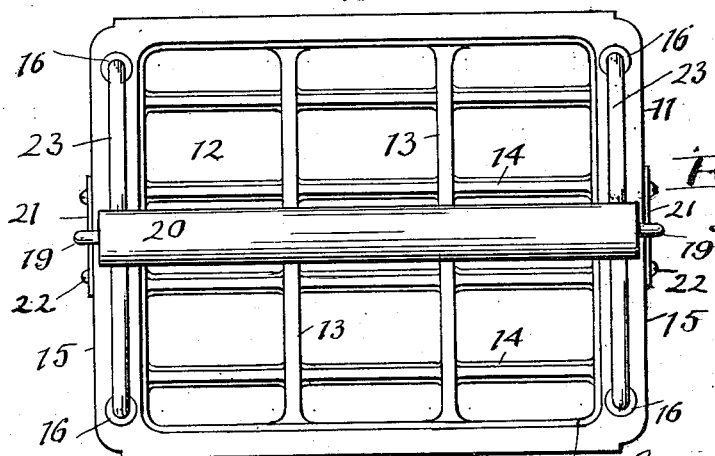

In the accompanying drawings, Fig. 1 is a side view of a container embodying the invention. with parts in section; Fig. 2 is an end view of the same with parts in section; and Fig. 3 is a plan view of the same.

The container shown, is of the multi-compartment type, and is provided with side walls 10, end walls 11, and bottom wall 12, transverse partitions 13. which divide the container into compartments, and upstanding ribs 14 at the bottom of each compartment to support the battery elements of the different cells. All these parts of the container are integrally formed preferably of hard rubber and preferably by a molding process, into a unitary structure. While the container has three cells, the number of cells may be greater or less than here shown.

The end walls are provided at the top thereof with outwardly projecting ledges 15, which extend substantially across the ends of the container. The under sides of the ledges are preferably square with the end walls so as to form shoulders for anchorage plates to be referred to. Extending up from the top of the end walls and formed preferably half on the overhanging ledges are bosses 16, and also formed on the end walls and on the bottom of the ledges are semi-cylindrical bosses or protuberances 17, which are directly beneath the upwardly projecting bosses 16.

At the center of the ledges the latter are provided with laterally open depressions or openings 18.

The container is provided with double handles or handles of two different types. One handle is of the bail type and consists of a wire bail 19, carrying a hard rubber roll 20. The ends of this bail are hooked into openings of anchorage plates 21, which are fastened to the outer faces of the ledges by screws 22 or equivalent holding devices, these screws entering the ledges on opposite sides of the central openings 18 which are provided for the purpose of receiving the inturned and hook-shaped ends of the bail 19, so as to permit the bail to have a free swinging movement. It is to be noted, however, that the anchorage plates 21 have inturned lips 21$^a$ which engage under the ledges 15, and the purpose of which is to relieve the screws 22 of the load when the battery is supported by the bail.

Additionally the container is provided at its ends with upstanding fixed handles, in this instance wire handles 23, whose ends are embedded in the end walls of the container. Although the particular manner of anchoring the ends of these wire handles and the formation of the container to accommodate the same are not claimed herein, but in a separate application filed of even date herewith, it may be stated that these handles are inserted in openings extending down through the bosses 16 and through the end walls and ledges to the bottom of the bosses 17, where the openings are partly exposed. The handles are inserted immediately after the containers are vulcanized, and before they have cooled and hardened, and when the container cools and therefore shrinks, the rubber tightly grips the embedded ends of the handles. The latter are preferably provided with upwardly facing prongs 23$^a$, which are embedded in the rubber by the shrinkage process incident to the cooling and effectively prevent the handles pulling out. However, if for any reason it is desired to remove the handles they can be readily driven out through the medium of a tool inserted in the lower ends of the handle openings, which as stated above are exposed at the bottom of the bosses 17.

When the battery employing this container is used in radio work, the bail handle is most convenient and will generally be used. If, however, the battery is used for starting, lighting and ignition purposes on motor vehicles, the wire handles will be employed not only when the battery is being handled, but also for engagement by the hold-down members when the battery is installed on a motor vehicle.

The top of the container is provided around its inner margin with a depression 24 to facilitate the sealing of the cell covers and the transverse partitions 13 are preferably extended up only to the base of this depression. These features, however, are claimed in the companion application referred to above.

While I have shown the preferred construction, I do not desire to be confined to the precise details illustrated, but aim in my claims to cover all modifications which do not involve a departure from the spirit and scope of my invention.

Having described my invention, I claim:

1. The combination with a storage battery container of rectangular form and having reinforcing ledges at the top of the end walls, of means for carrying the same comprising a bail handle adapted to support the container by means of ears disposed under the ledges whereby the weight of the container is transmitted to the under sides of the ledges thereby preventing distortion of the container.

2. The combination with a storage battery container of rectangular form and having reinforcing ledges at the top of the end walls extending substantially the full width thereof, of means for carrying the same comprising a bail handle attached to the container by means of anchorage plates having ears disposed under the ledges whereby the weight of the container is transmitted to the under sides of the ledges thereby preventing distortion of the container.

3. The combination with a storage battery container of rectangular form and having reinforcing ledges at the top of the end walls extending substantially the full width thereof, and recessed in the central portion, of means for carrying the same comprising a bail handle attached to the container by means of anchorage plates having ears disposed under the ledges whereby the weight of the container is transmitted to the under sides of the ledges thereby preventing distortion of the container, said bail handle ends extending into said recesses.

In testimony whereof, I hereunto affix my signature,

STANLEY T. CAMPBELL.